(12) United States Patent
Zhang et al.

(10) Patent No.: US 12,743,297 B2
(45) Date of Patent: Sep. 22, 2026

(54) LAYERED POOL FOR FLEXIBLE RESOURCE ALLOCATION

(71) Applicant: Omnissa, LLC, Mountain View, CA (US)

(72) Inventors: Yanchao Zhang, Beijing (CN); Jianming Fan, Beijing (CN); Kai Song, Beijing (CN); Yang Liu, Beijing (CN); Lin Lv, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 515 days.

(21) Appl. No.: 18/357,025

(22) Filed: Jul. 21, 2023

(65) Prior Publication Data

US 2024/0419474 A1 Dec. 19, 2024

(30) Foreign Application Priority Data

Jun. 15, 2023 (WO) ................ PCT/CN2023/100381

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS 11,948,004 B1 * 4/2024 Padmanabhan ....... H04L 67/148
2022/0382572 A1 * 12/2022 Lv ....................... G06F 9/45545
2023/0195507 A1 * 6/2023 Qiao ....................... G06F 9/485 718/102
2023/0205566 A1 * 6/2023 Huo .................... G06F 9/45545 718/1
2023/0376337 A1 * 11/2023 Eubanks ................. G06F 9/542
2024/0319949 A1 * 9/2024 Lv ........................... G06F 9/452

* cited by examiner

*Primary Examiner* — Wynuel S Aquino
(74) *Attorney, Agent, or Firm* — Kim & Stewart LLP

(57) ABSTRACT

Systems and methods are described for efficient and flexible way of allocating resources in remote computing environments. A "layered" hierarchy is described where a user can be provisioned with a virtual desktop from a virtual desktop pool in a first layer ("layer 1"), which can be configured for more common or basic usage. While working in the layer 1 desktop, when the user opens specific applications, such as applications that are resource-demanding or have other specific requirements, instead of launching those applications in the layer 1 desktop, the applications can be launched from a pool in a second layer ("layer 2") and be redirected to the layer 1 desktop. The layer 2 pool can be configured to suit the requirements of the specific application, such as by having more memory, virtual GPUs, different operating systems, etc.

20 Claims, 4 Drawing Sheets

LAYERED POOL FOR FLEXIBLE RESOURCE ALLOCATION

CLAIM OF PRIORITY

This application is based upon and claims the benefit of priority from International Patent Application No. PCT/CN2023/100381, filed on Jun. 15, 2023, which is incorporated by reference herein in its entirety.

TECHNICAL FIELD

The present disclosure generally relates to virtual desktop infrastructure and more specifically to techniques for more efficient allocation of resources in virtual desktop pools.

BACKGROUND OF THE INVENTION

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server, which is linked to the local client device over a network using a remote display protocol, such as Remote Desktop Protocol (RDP), PC-over-IP protocol (PCoIP), virtual network computing (VNC) protocol, or the like. Using the remote display protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

As remote computing becomes increasingly more prevalent in the workplace, reducing resource consumption without compromising user experience has become of paramount importance for enterprises and, especially in the public cloud, a key factor in winning business for service providers.

However, efficient allocation of resources to remote desktops poses numerous challenges, especially in enterprises where large numbers of users may have vastly different requirements, and where a user's requirements may constantly change depending on the work the user is doing and the applications they are using.

For example, programming platforms (e.g., MATLAB® available from MathWorks® Corporation), CAD apps, visual design apps, video/photo editing apps, and other types of applications may require significant resources (e.g., 8 GB and more) to operate. However, not every user in an enterprise may use such applications. A document writer normally consumes less resources than a developer who runs memory intensive programming apps. For example, a desktop configured with 2 vCPU (virtual CPU) and 4 GB memory would normally be sufficient for a user working on documents, but a desktop with even double the amount of such resources (4 vCPU and 8 GB memory) may be insufficient and slow for a user who is a developer.

Allocating just "enough" resources for every "typical" developer user, e.g. 32 GB memory and 4 vCPU is also not an efficient allocation of resources because different developers may have different requirements. For example, 16 GB of memory may be sufficient for a web developer but too small for an android developer who needs to run a simulator.

In addition, users may not consistently use the same quantity of resources as a user's requirements may change over time. For example, in a typical "design" phase, 4 GB of memory may be sufficient for a developer to perform tasks such as documentation/paperwork, etc. However, in a validation or simulation environment, even 32 GB memory may not be enough for the same developer.

Allocating excess resources, say 64 GB memory, to every developer is generally not acceptable because doing so is often prohibitively expensive. To compound the problem, some users (e.g., some developers) may require special hardware resources, such as virtual GPU (vGPU), which is not only expensive but also requires extra space in the datacenter, making it extremely burdensome to allocate such resources to large numbers of users. Thus, with respect to resource allocation, the standard for "enough" varies for different users and each user's requirements may change over time, making it difficult to allocate just "enough" resources to each user.

What is needed is a more efficient and flexible way of allocating resources in remote computing environments.

DETAILED DESCRIPTION OF THE INVENTION

Figure 1:
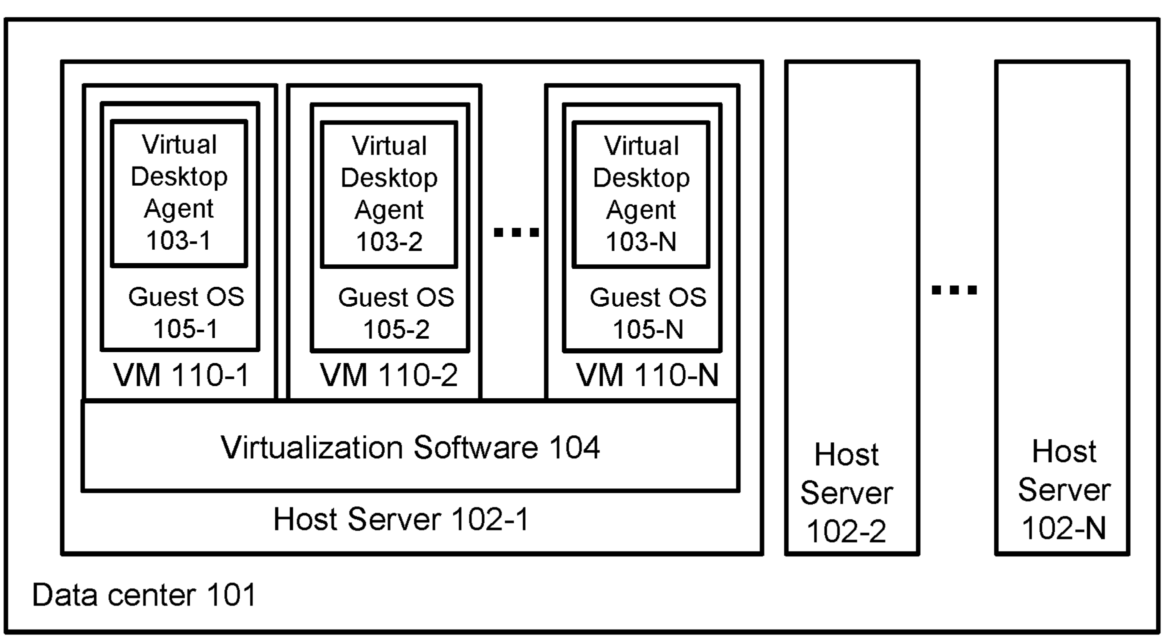
FIG. 1 illustrates an example of a virtual desktop environment, in accordance with various embodiments.
Figure 1:
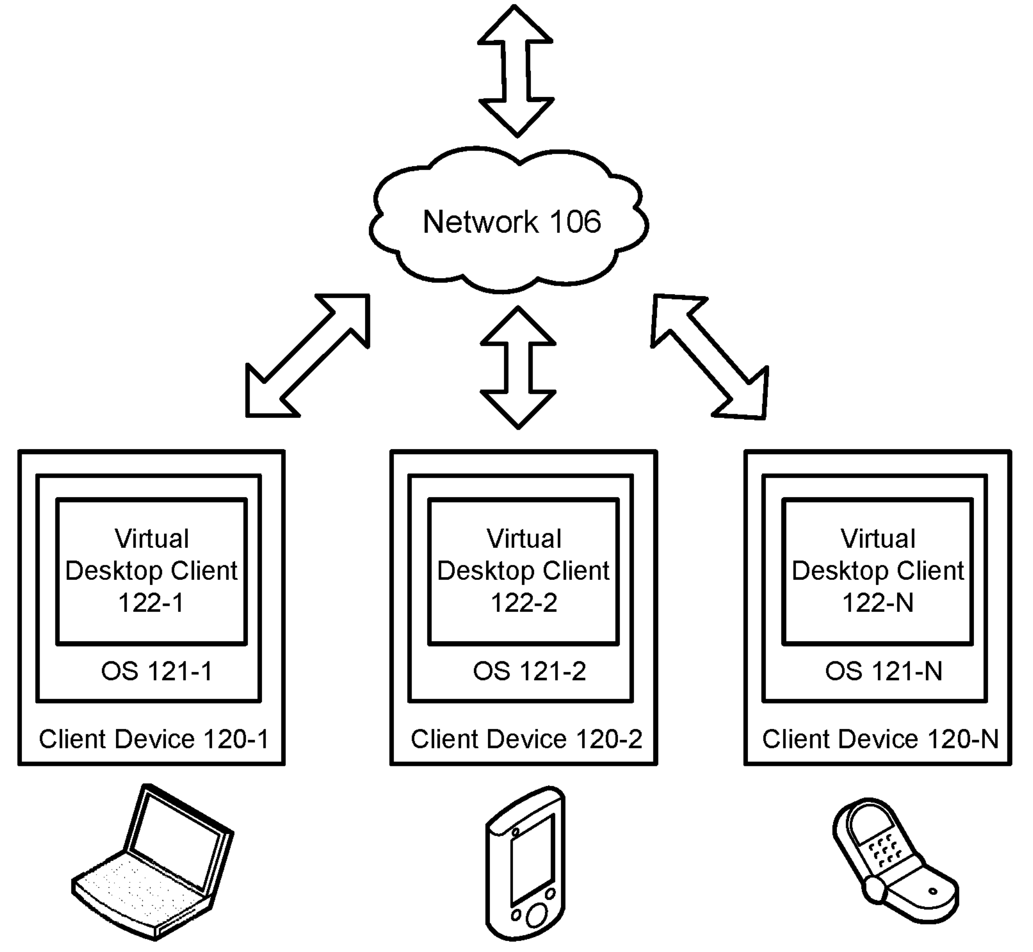

Systems and methods in accordance with various embodiments of the present disclosure overcome at least some of the above-mentioned shortcomings and deficiencies by providing efficient ways for allocating resources in remote computing environments. In particular, embodiments described herein leverage a "layered" hierarchy where a user can be provisioned with a virtual desktop from a pool of virtual desktops that are configured for more common or basic usage in a first layer (layer 1). While working in the provisioned desktop, when the user opens specific applications, such as applications that are resource-demanding or have other specific requirements, instead of launching those applications in the layer 1 desktop, the applications can be launched from a pool in a second layer (layer 2) and be redirected to the layer 1 desktop. The layer 2 pool can be configured to suit the requirements of the specific application, such as by having more memory (e.g., RAM (random access memory)), CPU (central processing unit), GPU (graphics processing unit), different operating systems, etc.

This way, for example, the user can be provisioned with a virtual desktop from a pool in layer 1 for performing ordinary tasks, such as working on documents, checking emails, etc., which is configured with more limited or standard resources. Then, when the user opens an application that may have high requirements (e.g., more memory or vCPU), or different requirements (e.g., vGPU or different operating systems (OS)), that application can be launched from a different pool (which can be an application pool) in layer 2 with more suitable configurations for the application and the application can be redirected to the virtual desktop in layer 1. The app can be redirected as a seamless window so that, to the user, it appears that the app runs in the layer 1 virtual desktop while it is actually executing in layer 2. As a result, resources can be allocated in a more efficient and flexible way, where the user is provided with a basic remote desktop optimized for performing typical work and more significant or specific resources are allocated to running certain applications as needed when the user opens such applications.

As used throughout this disclosure in the context of remote desktop environments, the terms, “desktop”, “remote desktop”, and “virtual desktop” are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user’s local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCOIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms “desktop”, “remote desktop”, and “virtual desktop” refer to a computing environment in which a user can launch, interact with, and manage the user’s applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application (“native client”), or a web browser (“web client”). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1,

110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
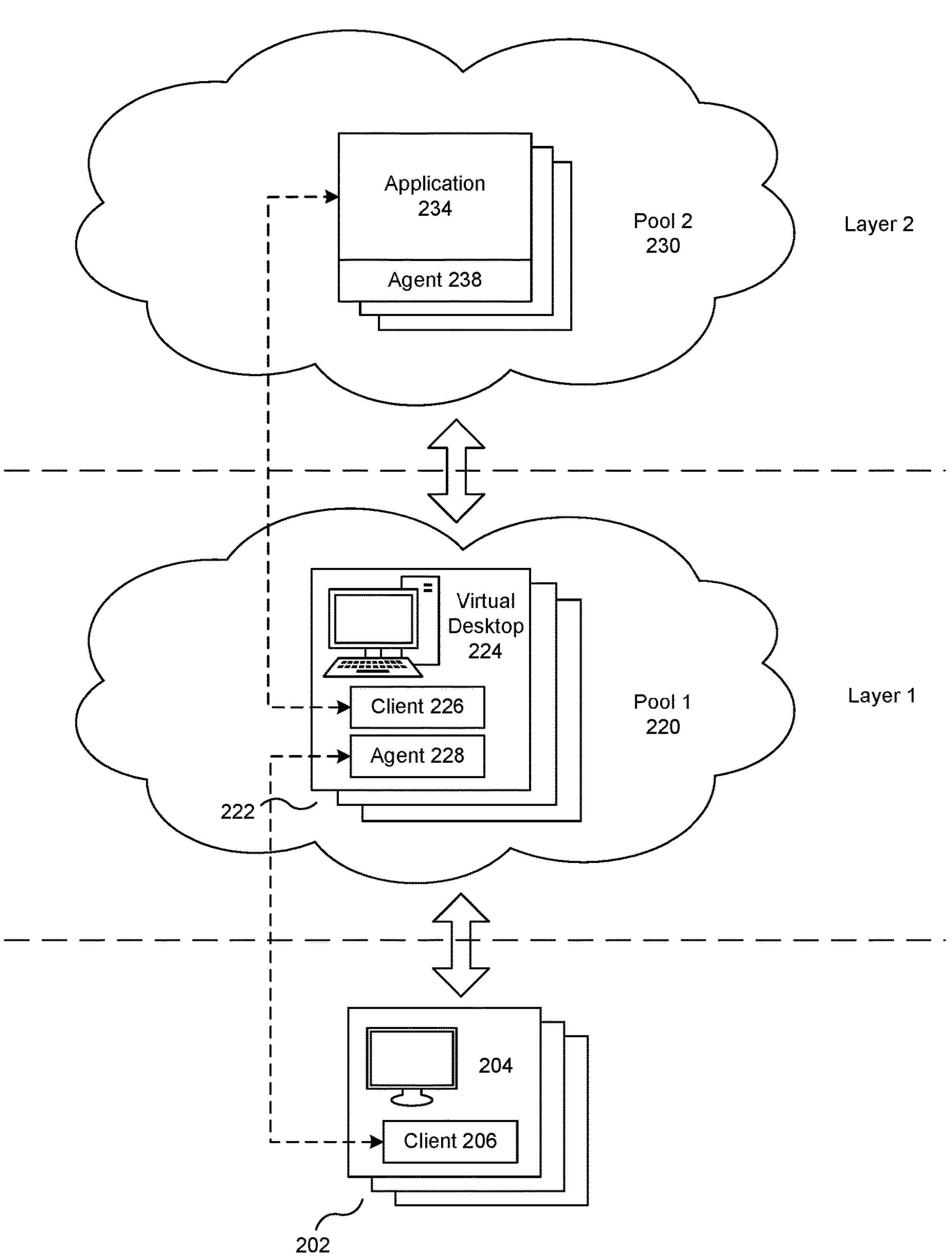
FIG. 2 illustrates an example architecture of a layered pool for flexible resource allocation, in accordance with various embodiments.

FIG. 2 illustrates an example architecture of a layered pool for flexible resource allocation, in accordance with various embodiments. As illustrated in the example of FIG. 2, client devices 202 can be configured to connect to virtual desktops 222 in a first pool 220 in layer 1, which can be a virtual desktop pool. A client device 204 can be any kind of computing device (laptop, desktop computer, smartphone, tablet, etc.) on which a client 206 (e.g., a virtual desktop client) can execute and connect to an agent 228 (e.g., a virtual desktop agent) running in a virtual desktop 224 in the pool 220 to establish a virtual desktop session, enabling the user of the client device 204 to access the virtual desktop 224, as described with greater detail in the example of FIG. 1 above.

As illustrated, the pool 220 can contain numerous virtual desktops 222. When a user logs in (e.g. via a connection server, which can also validate the user) and requests a virtual desktop, a virtual desktop such as desktop 224 can be provisioned to the user from the pool 220.

As will be appreciated by those skilled in the art, a virtual desktop pool, such as the pool 220 in the example of FIG. 2, can be a group of virtual desktops built from the same template, with identical resources (memory, disk, CPU, GPU, etc.), and managed as a unit. Pools provide an efficient and convenient mechanism for organizations to create, manage, and provision desktops to users. Organizations typically utilize different pools to accommodate different types of users, from pools of small virtual desktops with basic applications to pools of large, powerful virtual desktop with powerful computing resources, vGPUs, etc.

The virtual desktops 222 in the pool 220 can be a group of identically configured virtual machines running on a host server. In some cases, the pool 220 can span multiple servers. The virtual desktops 222 can be persistent or non-persistent. Virtual desktop pools and application pools are known to those skilled in the art and will not be discussed in great detail herein so as not to obscure salient features of the invention.

The example deployment illustrated in FIG. 2 can be utilized in an enterprise to provision employees with virtual desktops 222, which the employees can access using their respective client devices 202 as described above. The layer 1 pool 220 can be configured and optimized for common and basic usage by employees and the desktops 222 can be configured and optimized based on a target type of work. For example, if the pool 220 is for administrative workers, then the desktops 222 in the pool 220 may be optimized for work performed by administrative workers. In this case, the desktops 222 may be configured with pre-installed applications typically used by administrative workers (internet browsers, document editing software, etc.) and each desktop 222 in the pool can be configured with optimized resources (memory, vCPU, etc.) for the workers to perform typical tasks. If the pool 220 is for R&D (Research and Development) workers, then the desktops 222 in the pool 220 may be optimized for work performed by R&D workers. In this case, the desktops 222 can be configured with pre-installed applications frequently used by R&D workers (programming software, various tools, etc.) with appropriate resources (memory, vCPU, etc.) for the workers to perform their typical tasks, which would normally be different than in an administrative pool, for example. Other configurations of the desktops 222 such as the OS, various settings, tools, security features, licenses, etc. may likewise depend on the target work type of the pool. Generally, an organization would maintain different pools for different types of workers. For example, the pool 220 may be an administrator pool, an R&D pool, a sales and marketing pool, etc.

As illustrated, the virtual desktops 222 in layer 1 can be configured to access an application 234 in an application pool 230 in layer 2. In various embodiments, the application pool 230 can provide remote access to the remote application 234 for numerous users in a similar way as a virtual desktop pool (e.g., pool 1 220) provides remote access to virtual desktops. For example, from the application pool 230, an identical application with identical access to resources (memory, disk, CPU, GPU, etc.) can be delivered to each of numerous users. The application pool can give a user access to the application and not necessarily to the desktop in which the application runs as with virtual desktops. Like with virtual desktops, a client-agent framework can be utilized to deliver remote applications (e.g., 234) to users using a remote display protocol.

For example, a client 226 (e.g., a virtual desktop client) executing on the virtual desktop 224 can connect to an agent 238 (e.g., a virtual desktop agent) running in the layer 2 pool 230 (e.g., in a virtual machine or on a host computer hosting the application 234 in the layer 2 pool) to establish a remoting session enabling the virtual desktop 224 to access the application 234 running in the pool 230, and thereby allowing the user of the client device 204 to access the application 234 from within the virtual desktop session on the desktop 224. In this way, the application 234 executing in the layer 2 pool 230 can be redirected to the virtual desktop 224, allowing the user of the virtual desktop 224 to access the application 234 on the user's client device 204. Similarly, with this framework, the application 234 in the layer 2 pool 230 can be delivered to multiple virtual desktops 222 in the layer 1 pool 220 so that users of the virtual desktops 222 can access the application from within their virtual desktop 222.

As will be appreciated by those skilled in the art, different approaches can be used to deploy application pools allowing a hosted application to be provided to multiple remote users over a network, such as application pool 2 230. For example, the application 234 (and/or instances of the application 234) can run on a farm of host machines (e.g., RDS (Remote Desktop Services) hosts), which can be physical or virtual machines. In various embodiments, the application 234 can run in a VDI environment, on a virtual desktop (on top of a hypervisor), on virtual desktops in a desktop pool in layer 2

(e.g., the application or instances of the application can run on different virtual desktops in a pool of virtual desktops), etc. Whether the application pool 230 is deployed on a farm, on virtual desktops, or in another way, generally a client such as a virtual desktop client and an agent such as a virtual desktop agent can interoperate to provide access to the application in the application pool in a similar way as access is provided to virtual desktops. As will be appreciated by those skilled in the art, the agent can operate in various ways in the application pool; for example, it can operate in a VM, on a host computer where the application runs, in a desktop hosting the application, etc., depending on the type of deployment. For example, the client can convey user inputs to be injected into the application and the client can receive the GUI of the application from the agent and display it to the user. This can be performed using the same mechanism as in virtual desktops, except in the case of virtual applications the access can be limited to the application and not other portions of the desktop and OS where the application is hosted. As will be appreciated by those skilled in the art, different approaches not limited to those described herein are available and possible for deploying application pools and remote applications, and this invention is not limited to any particular approach.

In various embodiments, the application pool 230 can be configured to allocate certain defined resources to each application deployed to a user, or to allocate defined resources to each virtual machine or virtual desktop in which each deployed application runs. For example, like virtual desktops, the remoted application 234 (or the desktop on which the application 234 runs) can be allocated certain resources such as memory, CPU, GPU (or vCPU and vGPU), disk, etc., which can be fixed or variable. Different approaches can be taken to allocate fixed or variable resources to each application session in the pool 230 and the configuration can be based on the requirements of the application 234. For example, some applications may require certain amounts CPU, vGPU, OS, other software, etc. and the pools delivering those application can be configured according to the requirements of the application in the pool.

It should be mentioned that while the example of FIG. 2 only illustrates one application pool 230, multiple application pools can be utilized with each pool delivering an application to multiple virtual desktops. For example, a user of a virtual desktop may access an application from one application pool to use one application and another application from a different pool to use the other application.

For example, the layer 2 pool 230 can be powered by an automated farm and optimized for specific tasks or applications, e.g. it could be a vGPU-requiring application pool powered by vGPUs. Applications requiring GPU acceleration, such as computer graphics software or CAD applications can be published by (or delivered/hosted by) such a vGPU-enabled pool. Other applications like programming platforms or photo/video editing software, for example, can be grouped together and published by the same type of farm or from different farms depending on the usage.

As mentioned, the applications 234 can run in the layer 2 pool 230 while being accessed by the user via the layer 1 virtual desktops 222. The application 234 can appear to the users as if it is running in the layer 1 desktops 222 while actually executing in the layer 2 pool 230. The system can be configured so that when a user tries to open certain applications, those applications can be launched in the layer 2 pool 230 and be redirected to the user's virtual desktop 224 in the layer 1 pool 220 instead of being launched directly in the virtual desktop 224, which may either lack resources to run the application, have an incompatible OS, or for any other reason such as license compliance, security, and so on. For example, the applications 232 may be resource-demanding applications such as programming platforms (e.g., MATLAB® available from MathWorks® Corporation), CAD apps, visual design apps, video/photo editing apps, etc. and the virtual desktops 222 may lack sufficient resources (memory and vCPU) to run the apps properly. In some cases, the applications 234 may require different specific hardware (vGPU), operating systems, licensing requirements, etc. than are provided in the layer 1 pool 220.

For example, the layer 1 desktops 222 may be configured with applications and features typically needed by users for daily work so users may spend most of their time working in the layer 1 desktops 222. When a user tries to open an application 234 (e.g., by clicking an application icon) in the layer 1 desktop 224 that is configured to run out of the layer 2 pool 230 (e.g. the application 234 may not exist in the layer 1 desktops 222 or the app 234 may be designated (e.g., via policy that is defined by administrators) to run out of the layer 2 pool 230), the app 234 can be automatically launched in the layer 2 pool 230 and be redirected to the layer 1 desktop 224 for the user to use.

For example, the application 234 can be redirected to the desktop 224 so that the user can interact with the app 234 (e.g., see the application interface and produce inputs into the app 214) from within the desktop 224, thereby giving the user the illusion that the application 234 is running in the desktop 224 in pool 1 220 while it is actually running in the application pool 230.

To redirect the application 234 from the application pool 230 to the desktop 224, for example, the graphical user interface (GUI) of the application 234 can be streamed from the application pool 230 to the desktop 224 and presented in an application window in the desktop 224 so that the user can see the application 234 interface in the desktop 224 GUI, which is streamed to the client 206 and displayed on the client device 204 during the virtual desktop session on the desktop 224. More specifically, the application 234 GUI can be streamed from the application pool 230 to the desktop 224 and presented in a window in the GUI of the desktop 224. Then, the GUI of the desktop 226 containing the application 234 window can be streamed to the client 206 while the user accesses the virtual desktop 224 during the virtual desktop session. User inputs into the application 234 can be conveyed from the client device 204 (by the client 206) to the virtual desktop 224 (e.g., to the agent 228) during the virtual desktop session (e.g., in the same way as other inputs are conveyed from the client 206 to apps running in the virtual desktop 224). When the virtual desktop 226 receives the inputs targeting the application 234, it can send or forward those inputs to the application pool 230 to be effectuated in the application 234.

In various embodiments, when the application 234 is redirected to the virtual desktop 224, it can be presented as a seamless window to give the user the impression that the application 234 is running in the virtual desktop 224. "Seamless window", as used herein, refers to an application delivery method that allows remote applications to appear like local applications, giving users the illusion that the remote app is actually running locally (in this case, locally on the virtual desktop 224). For example, when the application 234 is redirected to the desktop 224, to present it as a seamless window the guest operating system's background where the application is running can be cropped, masked, or blocked leaving just the interface of the application 234 and the application 234 interface can be presented in a window in desktop 224 GUI, which gives the appearance that the application 234 is running locally on the desktop 224.

In such a deployment, users may perform most of their work in the first layer virtual desktop 224. Working in the first layer desktop 224, when the user requests or tries to open the application 324 (by clicking on it, etc.), like if an administrative worker tries to open a photo/video editing application or if an R&D users tries to open a CAD or graphic design application, the application 234 can be actually launched from the second layer pool 230 via the client 226 installed in the first layer pool (e.g., in the desktop 224), but the procedure would be transparent to the users and the application can be launched as a seamless app, so the users are not aware that the application 234 is being remoted.

Figure 3:
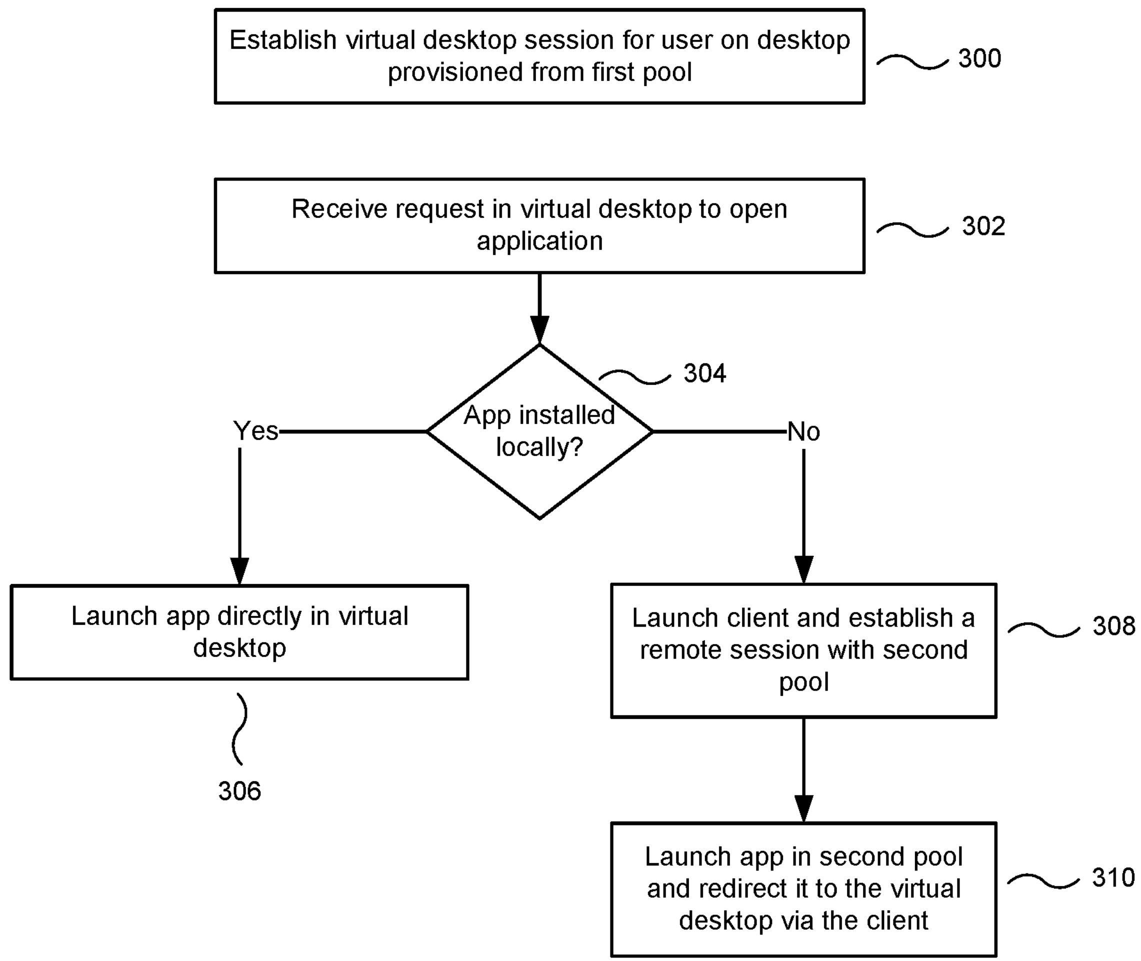
FIG. 3 illustrates an example process flow for redirecting an application from an application pool to a virtual desktop, in accordance with various embodiments.

FIG. 3 illustrates an example process flow for redirecting an application from an application pool to a virtual desktop, in accordance with various embodiments. In operation 300, a user can establish a virtual desktop session on a virtual desktop that is provisioned to the user from a first pool. In operation 302, a request can be received in the virtual desktop to open an application. For example, the user may click on an icon or otherwise produce an input requesting to open the application. In operation 304, a determination can be made of whether the application is installed locally on the virtual desktop or not.

If the application is installed on the virtual desktop, then the process can proceed to operation 306, where the application can be launched directly on the virtual desktop. If, on the other hand, the application is not installed on the virtual desktop, then the process can proceed to operation 308, where a client (e.g., a virtual desktop client) can be launched on the virtual desktop, and a remote session can be established with a second pool (an application pool) where the application can be accessed (e.g., via a virtual desktop agent operating in the second pool). The process can then proceed to operation 310, where the application can be launched in the second pool and redirected to the virtual desktop via the client to deliver the application to the user. The application can be delivered seamlessly so that the application appears and behaves from the user's point of view as a local application in the virtual desktop.

For example, to implement a process such as the example of FIG. 3, virtual desktops in the layer 1 pool can be configured with some applications installed locally on the virtual desktop and other applications to appear like they are installed locally (e.g., displaying UI (user interface) elements/objects such as an icon or a link to the application for the user) while they are not actually installed on the virtual desktop. Then, when the user tries to open the local applications, those applications can be launched directly in the virtual desktop in layer 1. When the user tries to open the applications that are not installed locally (e.g., UI elements/objects corresponding to the application such as icons and links to the application can be dummy elements/objects in this case), the system can automatically deliver the application from the layer 2 pool (e.g., after detecting that the dummy link/icon is pressed) as a remote application (e.g., the system can automatically launch a client and establish a remote session for accessing the application seamlessly from a layer 2 application pool).

In various embodiments, the virtual desktops can be configured so that certain designated applications (e.g., based on a policy) are delivered from the layer 2 pool by redirection and when the user attempts to open such a designated application in the layer 1 desktop, the system detects the user action and automatically launches a client and delivers the application to the user from layer 2 via redirection. For example, mechanisms can be used so that typical actions that a user would do to open the application, such as click on an icon or link trigger the process for delivering the remote application from layer 2.

In an embodiment, a policy (which can be predefined by administrators) can be implemented that indicates which applications in a virtual desktop running in layer 1 should be launched locally and/or which applications should be delivered from a layer 2 application pool. When the user requests to open an application, the system can first determine (e.g., after intercepting or detecting the user request to open the application) based on the policy whether the application requested by the user is designated for being launched locally or for being launched remotely. The system can then either launch the application locally or remotely, as indicated by the policy. With this approach, even if an application is installed on the layer 1 virtual desktop, it may nonetheless be delivered to the user remotely from layer 2 when the user tries to open it if the policy designates the policy for being delivered remotely. This can give the administrators more flexibility in how they manage desktops.

In various embodiments, a policy can define which applications are to be launched locally on a user's layer 1 desktop and which applications are to be launched in the layer 2 pool remotely and redirected to the user's layer 1 desktop based on user type or information in the user's profiles, such as the user role (e.g., administrators, R&D, etc.), geographic location of the user, permissions granted to the user, user priority, etc. For example, the policy may indicate that certain types of users (based on their profile information) should have a particular application launched locally on the layer 1 virtual desktop while other users (based on their profile information) should have the application redirected to their desktop from the layer 2 pool.

In various embodiments, when an application is requested by a user that is both installed on the layer 1 virtual desktop and is also available for being delivered as a remoted application from a pool in layer 2, a policy or some logic can be used by the system to determine whether the application should be launched locally or remoted from the application pool in layer 2. Such a policy or logic can take into account various variables. For example, the system can observe what resources (vCPU, vGPU, memory, etc.) are available to the layer 1 virtual desktop and/or what resources are available to the application in the layer 2 pool, and the policy can make the determination of where to launch the application (locally or remotely) based on this information. The logic can take into account various other information as well, such as information about the activity in the second layer pool (e.g., what available capacity the pool has and whether it is near to being scaled up or down) and information about such activity in the first layer pool, as well as any other information that can, for example, be used by the system to optimize allocation of resources. Other information that can be taken into account is network conditions, e.g., the conditions of the network connecting layer 1 to layer 2, physical geography of the user (e.g., for licensing concerns) and security, and so on.

To further improve efficiency of the system, various approaches can be utilized to scale and manage the pool deployments. For example, both the first layer and second layer pool can be powered off for cost savings in "idle" periods. "Just in time" platform creation technology can be used when users try to launch their first layer desktop for rapid provisioning of the desktops. Depending on pool usage statistics, administrators can pre-boot or pre-launch the first layer and/or second layer pool for better user experience.

In the second layer application pool, for example in an automated farm from which the applications are delivered in the layer 2 pool, the system resources can be monitored (such as CPU, memory, vGPU memory, etc.), and the farm can be scaled up (e.g. via just in time platform creation technology like instant clones) if the consumed resources reach a predefined threshold.

When users finish their work and close the applications running in the layer 2 application pool, the resource can be scaled back down. For example, the consumed resource can be returned back to the system and the unused cloned farm can be shut down, saving cost. Disconnected sessions can also be consolidated to one farm as long as the consumed system resource is below the preconfigured threshold, and thus other farms can be shut down.

In various embodiments, disconnected sessions can be managed based on a policy for consolidation. For example, after a predefined period of time (e.g., x hours) the sessions can be consolidated to another farm. After a second predefined period of time (e.g., y days), the application states can be saved and the application can be closed. If the user requests to use this application again, the system can relaunch the application and restore the saved status.

Numerous benefits can be achieved using a "layered" pool hierarchy as described above. For example, with the layered pool, users benefit with cross-platform advantages since they are able to use applications running in different computing environments. For example, applications that run on different operating systems can be used by the user (e.g., the first layer desktop can be a Windows® desktop and an application can be accessed that runs on a different operating system (e.g., Linux®) in the application pool in layer 2.

Further, some applications that have burdensome or unique requirements that are not practical of efficient to provide for in the user's virtual desktop that is used for typical tasks can be treated separately by delivering them from a different application pool in layer 2 meetings those requirement. Such applications may require specific resources like vGPU; have license restrictions, have security requirements, or they may be legacy applications requiring specific software or OSes. With a layered hierarchy a described herein, such applications can bre launched only on demand, and thus reduce resources and save cost. Likewise, "large" and/or hardware-dependent (e.g. vGPU) applications such as CAD and graphic design applications can be easier to deploy to users, since they can reside in a specialized layer 2 pool.

Further, with a seamless user experience, in various embodiments users can just "click" an application icon when they want to use it and the new remote session between the layer 1 desktop and layer 2 can be automatically set up transparently to the users.

There may be various benefits to the administrators as well because certain tasks such as desktop and application maintenance may be simplified. For example, for version control, when there is a need to update an application, an administrator may be able to just update the application in a particular farm, without the need to rebuild an entire desktop image containing the application.

In various embodiments, separate resource optimizers can also be used since layer 1 is more user/task oriented and layer 2 is more application/resource oriented.

Figure 4:
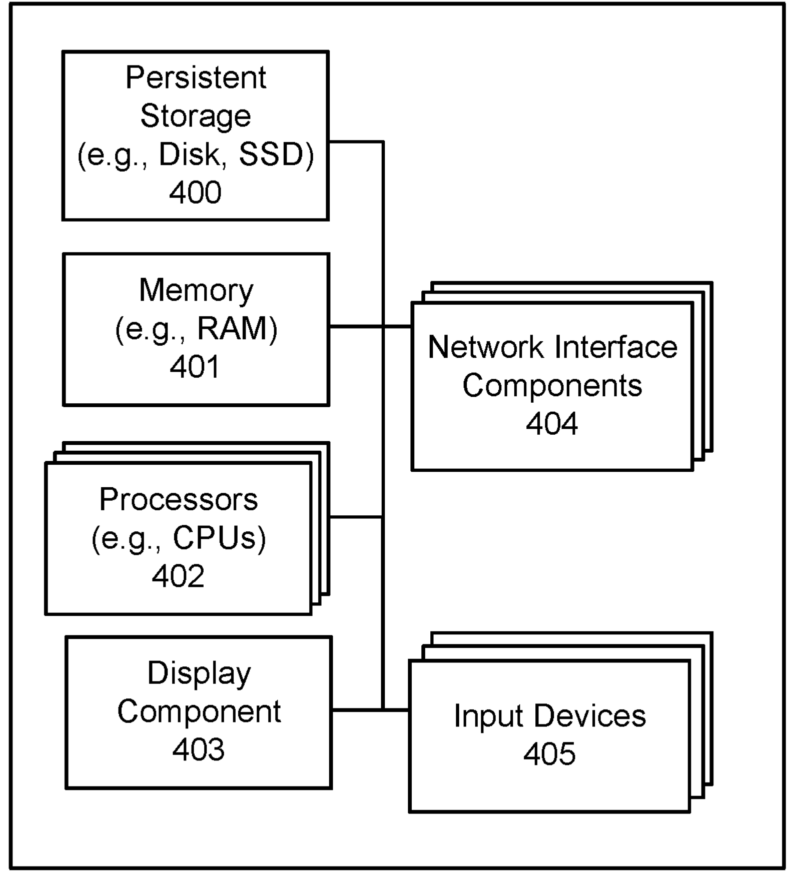
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi®, Bluetooth®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method, comprising:

establishing a first remoting session between a first client operating on a client device and a first agent operating on a host server, the remoting session configured to access a virtual desktop that is provisioned for a user from a virtual desktop pool;

receiving a user request in the virtual desktop to open an application in the virtual desktop;

in response to the user request to open the application, provisioning the application from an application pool and redirecting the application to the virtual desktop by:

launching a second client on the virtual desktop and establishing a second remoting session between the second client operating on the virtual desktop and a second agent operating in the application pool, the second remoting session configured to access the application that is provisioned from the application pool.

2. The method of claim 1, further comprising:

determining that the application is not installed on the virtual desktop; and in response to determining that the application is not installed on the virtual desktop, provisioning the application from the application pool and redirecting the application to the virtual desktop.

3. The method of claim 1, further comprising presenting a dummy icon corresponding to the application in the virtual desktop, wherein clicking on the dummy icon triggers provisioning the application from the application pool and redirecting the application to the virtual desktop.

4. The method of claim 1, further comprising maintaining a policy identifying applications that are designated for being launched remotely and redirected to the virtual desktop; and based on the policy, determining to redirect the application to the virtual desktop in response to the user request to open the application.

5. The method of claim 1, wherein at least one of:

the application requires more computing resources than are allocated to the virtual desktop; or the application requires different computing resources than are allocated to the virtual desktop; or the application requires a different operating system than the operating system of the virtual desktop.

6. The method of claim 1, wherein, at least one of:

each application in the application pool is deployed on a virtual machine (VM) to which more CPU (central processing unit) resources are allocated than to each virtual desktop in the virtual desktop pool;

each application in the application pool is deployed on a virtual machine (VM) to which more memory resources are allocated than to each virtual desktop in the virtual desktop pool;

each application in the application pool is deployed on a virtual machine (VM) to which more GPU (graphics processing unit) resources are allocated than to each virtual desktop in the virtual desktop pool; or each application in the application pool runs on a different operating system than the virtual desktops in the virtual desktop pool.

7. The method of claim 1, wherein the application is redirected from the application pool to the first virtual desktop as a seamless window.

8. A computing device, comprising:

at least one processor; and memory including instructions that, when executed by the at least one processor, cause the computing device to perform the steps of:

establishing a first remoting session between a first client operating on a client device and a first agent operating on a host server, the remoting session configured to access a virtual desktop that is provisioned for a user from a virtual desktop pool;

receiving a user request in the virtual desktop to open an application in the virtual desktop;

in response to the user request to open the application, provisioning the application from an application pool and redirecting the application to the virtual desktop by:

launching a second client on the virtual desktop and establishing a second remoting session between the second client operating on the virtual desktop and a second agent operating in the application pool, the second remoting session configured to access the application that is provisioned from the application pool.

9. The computing device of claim 8, wherein the memory further includes instructions that when executed by the at least one processor, cause the computing device to perform the steps of:

determining that the application is not installed on the virtual desktop; and in response to determining that the application is not installed on the virtual desktop, provisioning the application from the application pool and redirecting the application to the virtual desktop.

10. The computing device of claim 8, wherein the memory further includes instructions that when executed by the at least one processor, cause the computing device to perform the steps of:

presenting a dummy icon corresponding to the application in the virtual desktop, wherein clicking on the dummy icon triggers provisioning the application from the application pool and redirecting the application to the virtual desktop.

11. The computing device of claim 8, wherein the memory further includes instructions that when executed by the at least one processor, cause the computing device to perform the steps of:

based on a policy identifying applications that are designated for being launched remotely and redirected to the virtual desktop, determining to redirect the application to the virtual desktop in response to the user request to open the application.

12. The computing device of claim 8, wherein at least one of:

the application requires more computing resources than are allocated to the virtual desktop; or the application requires different computing resources than are allocated to the virtual desktop; or the application requires a different operating system than the operating system of the virtual desktop.

13. The computing device of claim 8, wherein, at least one of:

each application in the application pool is deployed on a virtual machine (VM) to which more CPU (central processing unit) resources are allocated than to each virtual desktop in the virtual desktop pool;

each application in the application pool is deployed on a virtual machine (VM) to which more memory resources are allocated than to each virtual desktop in the virtual desktop pool;

each application in the application pool is deployed on a virtual machine (VM) to which more GPU (graphics processing unit) resources are allocated than to each virtual desktop in the virtual desktop pool; or each application in the application pool runs on a different operating system than the virtual desktops in the virtual desktop pool.

14. The computing device of claim 8, wherein the application is redirected from the application pool to the first virtual desktop as a seamless window.

15. A non-transitory computer readable storage medium comprising one or more sequences of instructions, the instructions when executed by one or more processors causing the one or more processors to execute the operations of:

establishing a first remoting session between a first client operating on a client device and a first agent operating on a host server, the remoting session configured to access a virtual desktop that is provisioned for a user from a virtual desktop pool;

receiving a user request in the virtual desktop to open an application in the virtual desktop;

in response to the user request to open the application, provisioning the application from an application pool and redirecting the application to the virtual desktop by:

launching a second client on the virtual desktop and establishing a second remoting session between the second client operating on the virtual desktop and a second agent operating in the application pool, the second remoting session configured to access the application that is provisioned from the application pool.

16. The non-transitory computer readable storage medium of claim 15, further comprising instructions that when executed by the one or more processors cause the one or more processors to execute the operations of:

determining that the application is not installed on the virtual desktop; and in response to determining that the application is not installed on the virtual desktop, provisioning the application from the application pool and redirecting the application to the virtual desktop.

17. The non-transitory computer readable storage medium of claim 15, further comprising instructions that when executed by the one or more processors cause the one or more processors to execute the operations of:

presenting a dummy icon corresponding to the application in the virtual desktop, wherein clicking on the dummy icon triggers provisioning the application from the application pool and redirecting the application to the virtual desktop.

18. The non-transitory computer readable storage medium of claim 15, further comprising instructions that when executed by the one or more processors cause the one or more processors to execute the operations of:

based on a policy identifying applications that are designated for being launched remotely and redirected to the virtual desktop, determining to redirect the application to the virtual desktop in response to the user request to open the application.

19. The non-transitory computer readable storage medium of claim 15, wherein at least one of:

the application requires more computing resources than are allocated to the virtual desktop; or the application requires different computing resources than are allocated to the virtual desktop; or the application requires a different operating system than the operating system of the virtual desktop.

20. The non-transitory computer readable storage medium of claim 15, wherein, at least one of:

each application in the application pool is deployed on a virtual machine (VM) to which more CPU (central processing unit) resources are allocated than to each virtual desktop in the virtual desktop pool;

each application in the application pool is deployed on a virtual machine (VM) to which more memory resources are allocated than to each virtual desktop in the virtual desktop pool;

each application in the application pool is deployed on a virtual machine (VM) to which more GPU (graphics processing unit) resources are allocated than to each virtual desktop in the virtual desktop pool; or each application in the application pool runs on a different operating system than the virtual desktops in the virtual desktop pool.

* * * * *